Patented May 29, 1951

2,555,213

UNITED STATES PATENT OFFICE 2,555,213

METHOD OF MAKING LACTOSE

Alexander E. Wallace and David E. James, Jr., Columbus, Ohio, assignors to M & R Dietetic Laboratories, Inc., a corporation of Ohio No Drawing. Application June 30, 1947, Serial No. 758,222

14 Claims. (Cl. 127—31)

This invention relates to the recovery of lactose from lactose-bearing liquids. In its more limited aspects it relates to a process of recovering lactose in crystalline form of high purity from lactose-bearing liquids, particularly whey, in which the lactose-bearing liquids are subjected to a liming and heating step for the purpose of coagulating and precipitating proteins and certain mineral compounds contained therein.

The lactose of commerce is obtained from the milk of the cow and more specifically from products derived from milk, such as whey. Wheys contain in aqueous solution or suspension, in addition to variable quantities of lactose, variable amounts of proteins, salts, inorganic cations and anions, and other inorganic and organic substances of known and unknown chemical constitution. The composition of whey varies mainly according to the process whereby it is produced. Wheys obtained from the manufacture of casein and of certain cheeses such as cottage cheese, are higher in calcium and phosphorus content than are wheys obtained from the manufacture of certain other cheeses, such as the cheddar and Swiss types. Wheys obtained from the manufacture of certain products wherein relatively high acidity is developed by fermentation of the lactose are lower in lactose content than wheys obtained from the manufacture of products wherein substantial fermentation of the lactose does not occur. As an example, about 20% of the lactose originally present in the skim milk is destroyed in the process of making cottage cheese. Wheys are also widely variable with respect to pH, the range being from about 4.0 to 6.6. Wheys obtained from the manufacture of casein and of certain cheeses, such as cottage cheese, have pH's in the lower part of the range whereas wheys obtained from the manufacture of cheeses such as the cheddar and the Swiss types have pH's in the upper limit of the range.

Milk wheys of all types are examples of lactose-bearing liquids to which the process of this invention may be applied. As is well known in the art of manufacturing the lactose of commerce, the process of obtaining crystallized lactose must be such that the final product is essentially free from other non-lactose components co-existing in the lactose-bearing liquid. We have accomplished the recovery of crystalline lactose of high purity from lactose-bearing liquids by a novel and improved process.

In the conventional process as generally practiced in the art of recovering lactose from wheys, the whey proteins are coagulated by heating their solutions at a pH near their isoelectric point, or after adding sufficient lime to adjust the pH of their solution to about 6.2 to 6.4 (in the case of the lime-heat method a portion of the minerals are precipitated), the coagulated and precipitated substances are separated from the liquid, usually by filtration, the clarified liquid is partially condensed during which step additional coagulation and precipitation of substances occurs, the partially condensed liquid is subjected to filtration, the filtered liquid is condensed further to some definite concentration of total solids, the condensed liquid is subjected to controlled cooling so as to crystallize the lactose, the resulting masseculte is centrifuged to separate the crystallized lactose from the mother liquor, the lactose crystals are washed with water to free them of residual mother liquor and a goodly portion of the water-soluble non-lactose substances, the crystals are re-dissolved in water, the water solution of lactose is subjected to the action of purifying carbon and other chemicals and is filtered, the filtered solution is re-condensed, and the lactose is recrystallized, centrifuged, washed with water, and dried. The lactose produced by this process is of high purity and usually meets the U. S. P. standards. The yield of refined lactose, however, is usually about 50 to 60% of the amount of lactose originally present in the starting material. The lactose obtained on the first crystallization by the conventional process is usually contaminated with considerable quantities of mineral substances having low solubility in water.

The process of our invention is advantageous in relation to the conventional process in that only one step for separating the coagulated and precipitated substances from the liquid, one condensing step, one crystallizing step, and one centrifuging and washing step are necessary to recover crystalline lactose of high purity from lactose-bearing liquids. We have found it unnecessary to re-dissolve the once crystallized lactose and subject it to the various sequential processing steps of the conventional process in order to obtain crystalline lactose of high purity. By the use of the process of this invention we have been able consistently to effect yields of crystallized lactose of high purity amounting to about 75 to 85%, or even greater, of the amount of lactose originally present in lactose-bearing liquids such as wheys. The savings in time and labor, the reduction in cost per pound of final product, and the substantially increased yields of a valuable food substance are of very considerable economic importance.

The process of our invention essentially consists of the steps of adding lime to the lactose-bearing liquid, heating the liquid to coagulate the proteins and to precipitate a substantial portion of the mineral element, especially calcium and phosphorus, separating the coagulated and precipitated substances from the liquid by some suitable means, contacting the clarified liquid with a suitable cationic exchanger material to remove from the liquid most of the calcium and magnesium ions contained therein, condensing the liquid after treatment with cationic exchanger material to some definite concentration of solids, crystallizing the lactose present in the condensed liquid, centrifuging the resulting massecuite to separate the lactose crystals from the mother liquor, washing the lactose crystals with water to remove therefrom nearly all of the non-lactose substances, and drying the resulting crystalline lactose. The steps comprising the coagulation of proteins and the separation of the coagulum from the liquid logically precede the cationic exchange step in the process of our invention since the lime-heat method of coagulating proteins leaves in solution substantially less calcium than was originally present in the lactose-bearing liquid. This is a distinct advantage to our process because we are enabled thereby to treat more lactose-bearing liquid with a given quantity of cationic exchanger material than otherwise would be possible.

In the step of our process comprising the contacting of lactose-bearing liquids with cationic exchanger material certain salts present in the liquid having low solubility in water are converted to salts possessing the property of high solubility in water. This is accomplished primarily by removing from the liquid polyvalent cations and exchanging therefor monovalent cations. Lactose-bearing liquids, such as wheys derived from milk and milk products, contain calcium phosphate and calcium citrate; minor quantities of magnesium phosphate and magnesium citrate also are present. These salts are soluble at the concentrations in which they usually occur in wheys but are precipitated and become insoluble when their solutions are concentrated as is done in the condensing step in the process of manufacturing lactose. If not removed from the lactose-bearing liquid previous to the condensing step, or previous to the crystallizing step, they interfere with lactose crystallization, contaminate the crystallized lactose, and are not easily washed therefrom without redissolving inordinate amounts of lactose.

In the cationic exchange step of our process lactose-bearing liquid is contacted with suitable active cationic exchanger material thereby removing from the liquid most of the calcium and magnesium ions and exchanging therefor monovalent cations which thereupon form new salts, or acids, with the anions, especially phosphate and citrate ions, remaining in the liquid. These newly formed phosphate and citrate salts are highly soluble in water in contradistinction to the phosphates and citrates of polyvalent cations, especially calcium and magnesium, and remain in solution during the condensing step in the process of making lactose. Even though the newly formed salts may contaminate the lactose crystals upon separation from the mother liquor, they are easily washed therefrom without inordinate resolution of the lactose.

When a lactose-bearing liquid, such as whey, is contacted with cationic exchanger material acting in the alkali metal cycle, calcium and magnesium ions are removed from the liquid and alkali metal ions pass from the exchanger material into the liquid. This action converts the phosphates and citrates of calcium and magnesium into alkali metal phosphates and citrates. Potassium is also a normal constituent of lactose-bearing liquids. When whey is passed through a bed of cationic exchanger material acting in the sodium cycle, for instance, a considerable quantity of potassium ions is taken up by the exchanger material from the first fraction of whey through the bed. As the flow of whey through the bed continues the exchanger material becomes saturated with respect to potassium ions but still has power to take up calcium and magnesium ions for which the exchanger material has greater affinity. The exchanger material is now, in effect, acting in the potassium cycle and gives up its potassium ions in exchange for calcium and magnesium ions. The net effect, therefore, is that the exchanger material behaves as though it were acting in the sodium cycle throughout with respect to its taking up of calcium and magnesium ions. We are enabled thereby to treat a greater volume of whey per given volume of exchanger material than otherwise would be possible. We have found, further, that replacing calcium and magnesium ions in lactose-bearing liquids with alkali metal ions increases the pH of the liquid due to the greater alkali effect of the alkali metal ions. When we pass lactose-bearing liquids, such as whey, through a bed of cationic exchanger material acting in the hydrogen cycle the net effect is similar in that calcium and magnesium ions are taken up from the liquid, but hydrogen ions pass into the liquid converting the anions, originally combined with calcium and magnesium in the form of salts, to acids thereby lowering the pH of the liquid. When we pass lactose-bearing liquids, such as whey, through cationic exchanger material acting in the mixed alkali metal-hydrogen cycle the net effect is that calcium and magnesium ions are removed from the liquid and the anions remaining in the liquid are converted to a mixture of acids and alkali metal salts of these acids.

In carrying out the cationic exchange step of our process we prefer to have the cationic exchanger material acting solely in the alkali metal cycle or in the mixed alkali metal-hydrogen cycle. The cationic exchanger material may be activated to the alkali metal cycle by regenerating with an aqueous solution of a suitable alkali metal salt. We prefer to use sodium chloride for this purpose although other alkali metal salts, such as sodium sulfate, sodium acetate, potassium chloride, potassium sulfate, potassium acetate, and the like may be used. The cationic exchanger material may be activated to the mixed alkali metal-hydrogen cycle by regenerating with a solution of a suitable mixture of an alkali metal salt and an acid. For the purposes of this invention we prefer to use a very small proportion of acid and a very large proportion of salt in the regenerating solution since we desire to keep the pH of the liquid to be treated as high as possible.

We prefer to use a mixture of sodium chloride and hydrochloric acid for regenerating the exchanger material to the mixed cycle but other alkali metal salts such as listed elsewhere in this paragraph and other acids, such as sulfuric acid and acetic acid, and the like, can be used.

In the step of our process comprising the coagulation of the proteins present in the lactose-bearing liquid we add lime to the lactose-bearing liquid and heat the liquid to near its boiling point to effect coagulation of the proteins and precipitation of a portion of the mineral compounds. When we are working with acidulated lactose-bearing solutions having a pH not greater than about 5.5 we add a slurry of lime in sufficient quantity to raise the pH to within a range of about 5.8 to 6.8, preferably 6.2 to 6.4. A combination of lime and calcium chloride may be used for this purpose. When we are working with lactose-bearing liquids having a pH greater than about 5.6, usually about 6.0 to 6.6, we first add an acidifying agent to lower the pH of the liquid below about 5.5, say about 4.0 to 5.0, and preferably to about 4.1 to 4.6, then add slurry of lime in sufficient quantity to raise the pH to within a range of about 5.8 to 6.8, preferably 6.2 to 6.4. We prefer to use hydrochloric acid, or a combination of hydrochloric acid and calcium chloride, for the purpose of reducing the pH of the lactose-bearing liquid but other suitable acidifying agents may be used for this purpose. An alternate method may be used for reducing the pH in which the lactose-bearing liquid is seeded with a culture of microorganisms that ferment lactose and produce acids. We prefer not to use the alternate method because of the loss of lactose in the production of acids by the microorganisms.

In a typical operation of the process of our invention 5450 pounds of whey obtained from the manufacture of casein from skim milk by the hydrochloric acid process were heated to a temperature of about 205° F. When the temperature reached 170° F. in the heating step enough 10% slurry of lime was added to raise the pH of the whey to 5.81. The pH of the original whey was 5.19 which is somewhat higher than usually occurs in such wheys. The temperature was held at about 205° F. for 10 minutes with agitation in order to coagulate the proteins. The coagulum was permitted to settle for a period of 15 minutes during which a top layer of clear supernatant liquid formed. That portion of the whey containing the settled coagulum was drawn off and discarded and the supernatant liquid was filtered to remove a small quantity of suspended matter. Analyses showed that about 73% of the nitrogen, 55% of the calcium, and 71% of the phosphorus originally present in the whey were removed from the whey in this step of the process.

The filtered whey, amounting to about 4225 pounds, was percolated through a bed of carbonaceous cationic exchanger material acting in the mixed sodium-hydrogen cycle. The volume of exchanger material was 40 liquid gallons and was contained in a vertical cylinder of 17.5 inches internal diameter and 240 square inches internal horizontal cross section. Previous to the treatment of the whey the exchanger material was regenerated with 240 gallons of a solution containing 600 milliequivalents of sodium chloride and 106 milliequivalents of hydrochloric acid per liter and thereafter was washed with water to remove excess regenerating solution. The whey was percolated through the bed of exchanger material at the constant flow rate of 7 gallons per minute. The entire amount of whey was treated in one cycle of operation. The pH of the whey from the exchanger unit was 3.11 and analysis showed that only about 2% of the amount of the calcium originally present in the whey remained after cationic exchange treatment.

Prior to condensing, the whey was adjusted to a pH of 6.40 by adding a solution of sodium hydroxide. The whey was then condensed to a concentration of about 52% solids and the condensed liquid was subjected to controlled cooling and stirring to effect crystallization of the lactose. The massecuite was centrifuged in a perforated basket and the lactose crystals were washed with water to remove the residual mother liquor and other soluble substances. The wash water containing dissolved lactose was recovered and subsequently condensed. The condensed liquid was subjected to controlled cooling to crystallize the lactose which was then centrifuged and washed with water.

We recovered in the form of dry lactose about 79% of the lactose originally present in the whey. This lactose contained .023% nitrogen and 0.055% ash on a dry weight basis.

In another typical operation enough hydrochloric acid was added to sweet cheese whey, having a pH of 6.30, to lower the pH to 5.17. The whey was then heated to 150° F. and enough calcium chloride was added to lower the pH further to 5.00. As elevation of the temperature continued enough slurry of lime was added to raise the pH to 6.30. The temperature of the whey was held at about 205° F. to effect coagulation of the proteins and precipitation of a portion of the minerals present in the whey. The whey was then filtered to obtain a clear solution free from suspended material.

The filtered liquid was passed through carbonaceous cationic exchanger material acting in the mixed sodium-hydrogen cycle to effect removal of most of the calcium and magnesium contained therein. At this point the whey contained less than 1% of the calcium and about 35% of the nitrogen present in the original whey.

The whey was then subjected sequentially to the succeeding steps of the process to recover lactose in crystalline form. A yield of about 78% of the amount of lactose originally present in the whey was obtained. The crystallized lactose contained 0.030% nitrogen and 0.070% ash on a dry weight basis.

It will be understood that, in the practical operation of our invention, the fraction of the lactose-bearing liquid in which the settled coagulum is suspended would not be discarded as was done in one of the examples presented herein but, instead, would be subjected to separation by some suitable means to remove the coagulum from the liquid so as to recover substantially all of the liquid which contains valuable lactose.

Although we have found that the wash water containing dissolved lactose from the washing of the lactose crystals may be subjected to condensing, crystallizing, centrifuging, and washing of the lactose crystals to recover lactose of high purity, we can use an alternate procedure in which the wash water is added to a subsequent batch of whey and thereby subjected to all the sequential steps in the process beginning with the cationic exchange step.

We have found that, in the operation of our process, the mother liquor may be contacted with cationic exchanger material, the treated liquid condensed to a definite concentration of solids, the lactose crystallized, the crystals separated from the liquid and washed with water to recover about 40% of the lactose present in the mother liquor. This step increases the overall yield of lactose by about 5 to 10% depending primarily upon the amount of lactose in the mother liquor. In a practical operation this step may be carried out either by accumulating the mother liquor from several batches of whey and subjecting it to all of the steps of the process, or by adding the mother liquor to a subsequent batch of whey to be processed.

Cationic exchanger materials acting solely in the hydrogen cycle may be used in the operation of our process. We have found that cationic exchanger materials acting in the hydrogen cycle remove calcium and magnesium ions from lactose-bearing liquids, such as wheys, more efficiently than do exchanger materials acting solely in the alkali metal cycle or in the mixed alkali metal-hydrogen cycle, thus making it possible to treat a greater volume of lactose-bearing liquid per given volume of exchanger material. The pH of the liquid, however is thereby greatly decreased and, since we desire to sustain the pH at a high level at this point, we consider the use of cationic exchanger materials acting solely in the hydrogen cycle in the cationic exchange step of our process to be not as desirable as the other cationic exchanger materials mentioned.

In the step of our process comprising the coagulation of proteins we generally add acidifying agents to the lactose-bearing liquids if the pH of this liquid is higher than about 5.5 in order that we may add sufficient lime to effect protein coagulation without raising the pH above about 6.6. We have found that we can use an alternate procedure in effecting a lower pH in the lactose-bearing liquid and that this procedure can be used in the operation of our process.

In carrying out the alternate procedure a portion of the batch of lactose-bearing liquid from which the lactose is to be recovered is contacted with suitable cationic exchanger material acting solely in the hydrogen cycle thereby causing a decrease in the pH of the treated liquid. The treated liquid, having a low pH, say from about 1.5 to 3.5, is mixed in proper proportions with the rest of the batch of liquid, having a high pH, to obtain a blended liquid having the desired pH. Lime is then added and the lactose-bearing liquid is subjected to all the sequential steps of the process.

In a typical operation a quantity of whey, having a pH of 6.08, was percolated through a bed of carbonaceous cationic exchanger material acting in the hydrogen cycle. A mixture of 6 quarts of the treated whey and 25 quarts of the original whey had a pH of 4.62. A mixture of 8 quarts of the treated whey and 30 quarts of the original whey had a pH of 4.51. A mixture of 9 quarts of the treated whey and 30 quarts of the original whey had a pH of 4.47. A mixture of 10 quarts of the treated whey and 30 quarts of the original whey had a pH of 4.44. All of these mixtures possessed pH's in a range favorable for the addition of lime in amounts sufficient to effect satisfactory protein coagulation upon heating. Lesser proportions of the treated whey could have been used in accomplishing the intended purpose.

When the cationic exchanger material is to be regenerated to the alkali metal cycle, a solution containing between about 300 and 1,500, preferably about 1,000, milliequivalents of alkali metal salt per liter is used. Satisfactory regeneration is achieved by using between about 3 and 15 gallons of regenerating solution per liquid gallon of exchanger material. In a typical example where a solution containing about 1,000 milliequivalents of sodium chloride per liter was used for the purpose of regenerating a bed of carbonaceous cationic exchanger material, and where such solution was percolated through the bed at room temperature at a flow rate in the vicinity of 5 gallons per liquid gallon of exchanger material per hour, about 6 gallons of regenerating solution per liquid gallon of exchanger material were required to effect satisfactory regeneration.

When the cationic exchanger material is to be regenerated to the hydrogen cycle, a solution containing between about 100 and 600, preferably about 400, milliequivalents of acid per liter is used. Satisfactory regeneration is achieved by using between about 3 and 15 gallons of regenerating solution per liquid gallon of exchanger material. In a typical example where a solution containing about 400 milliequivalents of hydrochloric acid per liter was used for the purpose of regenerating a bed of carbonaceous cationic exchanger material and where such solution was percolated through the bed at room temperature at a flow rate in the vicinity of 5 gallons per liquid gallon of exchanger material per hour, about 6 gallons of regenerating solution per liquid gallon of exchanger material were required to effect satisfactory regeneration.

When the cationic exchanger material is to be regenerated to the mixed alkali metal-hydrogen cycle, a solution containing between about 500 and 1,500, preferably about 1,000, milliequivalents of alkali metal salt and between about 5 and 110, preferably about 10, milliequivalents of acid per liter is used Lower proportions of alkali metal salt and higher proportions of acid may be employed but in such cases the pH of lactose-bearing liquids subsequently treated by exchanger materials thus regenerated is lowered. In the operation of our invention we desire to maintain the pH as near the range of 6.0 to 6.6 as possible so we prefer to use about 100 times as much alkali metal salt as acid, on a chemical equivalence basis, for regenerating the cationic exchanger material when it is to be used while acting in the mixed alkali metal-hydrogen cycle. Satisfactory regeneration is effected by using between about 3 and 15 gallons of regenerating solution per liquid gallon of exchanger material. In a typical example where a solution containing about 1,000 milliequivalents of sodium chloride and about 10 milliequivalents of hydrochloric acid per liter was used for the purpose of regenerating a bed of carbonaceous cationic exchanger material, and where such solution was percolated at room temperature through the bed at a flow rate in the vicinity of 5 gallons per liquid gallon of exchanger material per hour, about 6 gallons of the regenerating solution per liquid gallon of exchanger material were required to effect satisfactory regeneration.

When treating lactose-bearing liquids, such as whey, with cationic exchanger material in the operation of our process, we prefer to use a flow rate of about 0.175 gallon per liquid gallon of exchanger material per minute. We have found that when the flow rate is substantially increased the exchanger material becomes less efficient in removing cations from the lactose-bearing liquid;

consequently, polyvalent cations, particularly calcium and magnesium ions, remain in the treated liquid in too large amounts and adversely affect the purity of the crystalline lactose ultimately recovered from the liquid. On the other hand, when the flow rate is substantially decreased the efficiency of cation removal from the lactose-bearing liquid is not sufficiently increased to justify the longer time thereby required to treat a given volume of the liquid. It should be understood, however, that flow rates other than the preferred rate may be used in carrying out the cationic exchange step of our process.

We have found that a variable relationship exists between the volume of lactose-bearing liquid that can be passed through the bed before the exchanger material becomes too spent to remove cations, especially calcium and magnesium ions, to the extent desired for the purposes of our invention. About 8 to 15 gallons of lactose-bearing liquid per liquid gallon of cationic exchanger material can be treated to remove calcium and magnesium ions therefrom to the extent necessary for ultimately recovering crystalline lactose of high purity. There is a direct relation between the concentration of calcium and magnesium ions in the lactose-bearing liquid and the volume of this liquid that can be treated effectively by a given volume of active exchanger material. The step of our process comprising the use of lime and heat for the purpose of protein coagulation is definitely advantageous with respect to the volume of lactose-bearing liquid that can be treated effectively by a given volume of exchanger material. The lime-heat method not only effects coagulation of the proteins but also effects the precipitation of a substantial portion of the calcium as calcium phosphate which is then removed from suspension in the lactose-bearing liquid previous to the cationic exchange step. In a typical operation 45% of the calcium present in a batch of whey obtained from the manufacture of casein by the hydrochloric acid process was removed from the whey by the lime-heat step followed by a filtration step. In another typical operation 55% of the calcium present in whey obtained from the manufacture of casein by the hydrochloric acid process was removed therefrom by the lime-heat step and the succeeding filtration step. Other factors that affect the amount of lactose-bearing liquid that can be treated by a given quantity of cationic exchanger material are the type of cationic exchanger materials and the degree of regeneration to which the exchanger material has been subjected.

When lactose-bearing liquids, such as whey, are contacted with a bed of active cationic exchanger material only traces of calcium appear in the first fraction of effluent but subsequently the calcium concentration in the effluent rises slowly as the volume of liquid passed through the exchanger material increases. When the instantaneous concentration of calcium in the effluent amounts to about 2 to 5, preferably about 3, milliequivalents per liter we stop the operation and regenerate the exchanger material before proceeding to the processing of the next batch of lactose-bearing liquid. When a substantially greater volume of lactose-bearing liquid is percolated through the bed of exchanger material the concentration of calcium and magnesium in the effluent becomes too great and the purity of the crystalline lactose ultimately recovered from the liquid is adversely affected. It is to be understood that when crystalline lactose of lesser purity is acceptable the volume of lactose-bearing liquid treated in the cationic exchange step of our process may be substantially increased and, at the point at which treatment is stopped, the instantaneous concentration of calcium in the effluent may be substantially greater than 5 milliequivalents per liter.

When lactose-bearing liquids having a pH lower than about 5.7 are heated during the condensing step of the process a brownish colored substance of unknown composition is formed, especially if the heating is excessive with respect to time and/or temperature. This insoluble substance may contaminate the crystallized lactose ultimately recovered from the liquid and is not easily removed therefrom by washing with water. Before proceeding to the condensing step of our process we have found it advantageous to have the pH of the lactose-bearing liquid in a range of about 5.8 to 6.6, preferably about 6.2 to 6.4. In those cases where the pH of the liquid is lower than the specified range as the result of preceding processing steps we add an alkali metal hydroxide, such as sodium and/or potassium hydroxide, to raise the pH to the preferred range. We have found that when the pH of the liquid is adjusted to within the specified range previous to the condensing step the amount of brownish colored substance formed is inconsequential, or even nil.

We prefer to condense the lactose-bearing liquid to a total solids concentration of about 70%, or to that concentration at which proper "graining" of the lactose is observed, in order to minimize the losses of lactose in the mother liquor. The small quantity of salts having low solubility in water that remain in the lactose-bearing liquid after effective treatment with cationic exchanger material permits concentration of the liquid to a higher degree than otherwise is possible.

In the operation of our invention we have found that the coagulated proteins and other precipitated substances may be separated from the lactose-bearing liquid by filtration, sedimentation, decantation, siphonation, centrifugation in imperforate bowl, or by various combinations of the foregoing methods.

The use of carbonaceous cationic exchanger material in the examples presented herein does not constitute a preference for this type of exchanger material. Cationic exchanger materials of the carbonaceous type, of the resinous type, and of other types that effect similar results may be used in the operation of our invention.

We claim:

1. In the method of recovering lactose of high purity from whey comprising, heating a mixture of whey and lime having a pH within the approximate range of 5.8 to 6.8 to coagulate the whey proteins, separating the coagulated proteins from the whey liquid, contacting the whey liquid with a cation exchange material having replaceable monovalent cations, to effect removal of calcium and magnesium ions contained in said whey liquid and convert the normally insoluble whey salts to normally soluble salts and/or acids, and condensing the cation-exchanged whey liquid to a concentration suitable for graining of the lactose therein in the presence of the said soluble salts.

2. In the method of recovering lactose of high purity from whey comprising, heating a mixture of whey and lime having a pH within the approximate range of 5.8 to 6.8 to coagulate the whey proteins, separating the coagulated proteins from the whey liquid, contacting the whey liquid with a cation exchange material having replaceable monovalent cations, to effect removal of calcium and magnesium ions contained in said whey liquid and convert the normally insoluble whey salts to normally soluble salts and/or acids, adjusting the pH of the cation-exchanged whey liquid to a pH within the approximate range of 5.8 to 6.6, and condensing the resulting pH-adjusted whey liquid to a concentration suitable for graining of the lactose therein in the presence of the said soluble salts.

3. In the method of recovering lactose of high purity from whey comprising, heating a mixture of whey and lime having a pH within the approximate range of 5.8 to 6.8 to coagulate the whey proteins, separating the coagulated proteins from the whey liquid, contacting the whey liquid with a cation exchange material acting in the alkali metal cycle, to effect removal of calcium and magnesium ions contained in said whey liquid and convert the normally insoluble whey salts to normally soluble salts, and condensing the cation-exchanged whey liquid to a concentration suitable for graining of the lactose therein in the presence of the said soluble salts.

4. In the method of recovering lactose of high purity from whey comprising, heating a mixture of whey and lime having a pH within the approximate range of 5.8 to 6.8 to coagulate the whey proteins, separating the coagulated proteins from the whey liquid, contacting the whey liquid with a cation exchange material acting in the mixed alkali metal-hydrogen cycle, to effect removal of calcium and magnesium ions contained in said whey liquid and convert the normally insoluble whey salts to normally soluble salts and/or acids, and condensing the cation-exchanged whey liquid to a concentration suitable for graining of the lactose therein in the presence of the said soluble salts.

5. In the method of recovering lactose of high purity from whey comprising, adding lime to whey of a pH below about 5.5 until the limed whey has a pH within the approximate range of 5.8 to 6.8, heating the limed whey to coagulate the whey proteins, separating the coagulated proteins from the whey liquid, contacting the whey liquid with a cation exchange material having replaceable monovalent cations, to effect removal of calcium and magnesium ions contained in said whey liquid and convert the normally insoluble whey salts to normally soluble salts and/or acids, and condensing the cation-exchanged whey liquid to a concentration suitable for graining of the lactose therein in the presence of the said soluble salts.

6. In the method of recovering lactose of high purity from whey comprising, adding lime to whey of a pH below about 5.5 until the limed whey has a pH within the approximate range of 5.8 to 6.8, heating the limed whey to coagulate the whey proteins, separating the coagulated proteins from the whey liquid, contacting the whey liquid with a cation exchange material having replaceable monovalent cations, to effect removal of calcium and magnesium ions contained in said whey liquid and convert the normally insoluble whey salts to normally soluble salts and/or acids, adjusting the pH of the cation-exchanged whey liquid to a pH within the approximate range of 5.8 to 6.6, and condensing the resulting pH-adjusted whey liquid to a concentration suitable for graining of the lactose therein in the presence of the said soluble salts.

7. In the method of recovering lactose of high purity from whey comprising, acidulating whey of a pH above about 5.5 until the pH of the acidulated whey is within the approximate range of 4.0 to 5.0, adding lime to the said acidulated whey until the limed whey has a pH within the approximate range of 5.8 to 6.8, heating the limed whey to coagulate the whey proteins, separating the coagulated proteins from the whey liquid, contacting the whey liquid with a cation exchange material having replaceable monovalent cations, to effect removal of calcium and magnesium ions contained in said whey liquid and convert the normally insoluble whey salts to normally soluble salts and/or acids, and condensing the cation-exchanged whey liquid to a concentration suitable for graining of the lactose therein in the presence of the said soluble salts.

8. In the method of recovering lactose of high purity from whey comprising, acidulating whey of a pH above about 5.5 until the pH of the acidulated whey is within the approximate range of 4.0 to 5.0, adding lime to the said acidulated whey until the limed whey has a pH within the approximate range of 5.8 to 6.8, heating the limed whey to coagulate the whey proteins, separating the coagulated proteins from the whey liquid, contacting the whey liquid with a cation exchange material having replaceable monovalent cations, to effect removal of calcium and magnesium ions contained in said whey liquid and convert the normally insoluble whey salts to normally soluble salts and/or acids, adjusting the pH of the cation-exchanged whey liquid to a pH within the approximate range of 5.8 to 6.6, and condensing the resulting pH-adjusted whey liquid to a concentration suitable for graining of the lactose therein in the presence of the said soluble salts.

9. In the method of recovering lactose of high purity from whey comprising, contacting whey of a pH above about 5.5 with a cation exchange material acting in the hydrogen cycle to lower the pH of the whey to within the approximate range of 1.5 to 3.5, mixing the resulting whey with the starting whey in amounts to provide in the mixture a pH within the approximate range of 4.0 to 5.0, adding lime to said mixture until the limed whey has a pH within the approximate range of 5.8 to 6.8, heating the limed whey to coagulate the whey proteins, separating the coagulated proteins from the whey liquid, contacting the whey liquid with a cation exchange material having replaceable monovalent cations, to effect removal of calcium and magnesium ions contained in said whey liquid and convert the normally insoluble whey salts to normally soluble salts and/or acids, and condensing the cation-exchanged whey liquid to a concentration suitable for graining of the lactose therein in the presence of the said soluble salts.

10. In the method of recovering lactose of high purity from whey comprising, contacting whey of a pH above about 5.5 with a cation exchange material acting in the hydrogen cycle to lower the pH of the whey to within the approximate range of 1.5 to 3.5, mixing the resulting whey with the starting whey in amounts to provide in the mixture a pH within the approximate range of 4.0 to 5.0, adding lime to said mixture until the limed whey has a pH within the approximate range of 5.8 to 6.8, heating the limed whey to coagulate the whey proteins, separating the coagulated proteins from the whey liquid, contacting the whey liquid with a cation exchange material having replaceable monovalent cations, to effect removal of calcium and magnesium ions contained in said whey liquid and convert the normally insoluble whey salts to normally soluble salts and/or acids, adjusting the pH of the cation-exchanged whey liquid to a pH within the approximate range of 5.8 to 6.6, and condensing the resulting pH-adjusted whey liquid to a concentration suitable for graining of the lactose therein in the presence of the said soluble salts.

11. In the method of recovering lactose of high purity from a lactose-bearing proteinaceous liquid comprising, heating a mixture of the lactose-bearing liquid and lime having a pH within the approximate range of 5.8 to 6.8 to coagulate the proteins in said liquid, separating the coagulated proteins from the liquid, contacting the residual liquid with a cation exchange material having replaceable monovalent cations to effect removal of calcium and magnesium ions contained in said liquid and convert the normally insoluble salts therein to normally soluble salts and/or acids, and condensing the cation-exchanged liquid to a concentration suitable for graining of the lactose therein in the presence of the said soluble salts.

12. In the method of recovering lactose of high purity from whey comprising, heating a mixture of whey and lime having a pH within the approximate range of 5.8 to 6.8 to a temperature near the boiling point of the whey to coagulate the whey proteins, separating the coagulated proteins from the whey liquid, contacting the whey liquid with a cation exchange material having replaceable manovalent cations, to effect removal of calcium and magnesuim ions contained in said whey liquid and convert the normally insoluble whey salts to normally soluble salts and/or acids, and condensing the cation-exchanged whey liquid to a concentration suitable for graining of the lactose therein in the presence of the said soluble salts.

13. In the method of recovering lactose of high purity from a lactose-bearing proteinaceous liquid comprising, heating a mixture of the lactose-bearing liquid and lime having a pH within the approximate range of 5.8 to 6.8 to a temperature near the boiling point of the lactose-bearing liquid to coagulate the proteins in said liquid, separating the coagulated proteins from the liquid, contacting the residual liquid with a cation exchange material having replaceable monovalent cations to effect removal of calcium and magnesium ions contained in said liquid and convert the normally insoluble salts therein to normally soluble salts and/or acids, and condensing the cation-exchanged liquid to a concentration suitable for graining of the lactose therein in the presence of the said soluble salts.

14. In the method of recovering lactose in a crystalline form of high purity from a lactose-bearing, proteinaceous liquid comprising, heating a mixture of the said lactose-bearing liquid and lime to coagulate the proteins in said liquid, separating the coagulated proteins from the liquid, contacting the said liquid with a cationic exchanger material having replaceable monovalent cations therein to effect replacement of calcium and magnesium ions in said liquid with the monovalent cations in the exchanger material, thereby changing those salts in the lactose-bearing liquid characterized by low solubility in water to salts and/or acids having high solubility in water, adjusting the pH of the treated liquid with a neutralizing agent so that it falls within the approximate range of 5.8 to 6.6, and condensing the resulting liquid until graining suitable for lactose crystallization is obtained in the presence of the said soluble salts.

ALEXANDER E. WALLACE.
DAVID E. JAMES, Jr.

REFERENCES CITED

The following references are of record in the file of this patent:

UNITED STATES PATENTS

| Number | Name | Date |
|---|---|---|
| 931,584 | Dunham | Aug. 17, 1909 |
| 1,428,820 | Thomson | Sept. 12, 1922 |
| 1,600,573 | Bell | Sept. 21, 1926 |
| 2,006,699 | Supplee | July 2, 1935 |
| 2,359,902 | Dahlberg | Oct. 10, 1944 |

FOREIGN PATENTS

| Number | Country | Date |
|---|---|---|
| 13,444 | Great Britain | of 1890 |
| 23,875 | Great Britain | of 1897 |
| 248,998 | Great Britain | Mar. 18, 1926 |
| 542,846 | Great Britain | Jan. 29, 1942 |
| 116,691 | Australia | Mar. 9, 1943 |

OTHER REFERENCES

Myers et al., Ind. & Eng. Chem., vol. 33, No. 6, June 1941; pages 697–706.